Sept. 26, 1939.  Y. SEKELLA  2,173,983

ENGINE STARTER GEARING

Filed Jan. 5, 1938

Witness:
Burr W. Jones

INVENTOR.
BY Youston Sekella
Clinton S. Janes
ATTORNEY

Patented Sept. 26, 1939

2,173,983

UNITED STATES PATENT OFFICE 2,173,983

ENGINE STARTER GEARING

Youston Sekella, Elmira, N. Y., assignor, by mesne assignments, to Bendix Aviation Corporation, South Bend, Ind., a corporation of Delaware Application January 5, 1938, Serial No. 183,500

3 Claims. (Cl. 74—7)

The present invention relates to engine starter gearing and more particularly to that type known as the manual shift in which a motor-driven pinion is moved by the operator into and out of mesh with a member such as a flywheel gear of the engine to be started.

In starter gearing of this type, it is customary to incorporate some form of overrunning clutch connection between the pinion and the starting motor shaft so that when the engine starts, it may accelerate freely without transmitting its rotation to the starting motor. Various types of overrunning clutches have been employed, but those in use have in general been subject to one or more of the objections that they slipped, jammed, had excessive backlash, were noisy, harsh in action or expensive.

It is an object of the present invention to provide a novel manual shift starter incorporating an overrunning connection which is positive in action without undue shock, and free from jamming or wedging.

It is another object to provide such a device in which the unit pressures on the parts are low, the operation is quiet and cushioned, and the structure is simple and inexpensive.

Further objects and advantages will be apparent from the following description taken in connection with the accompanying drawing in which.

Figure 1:
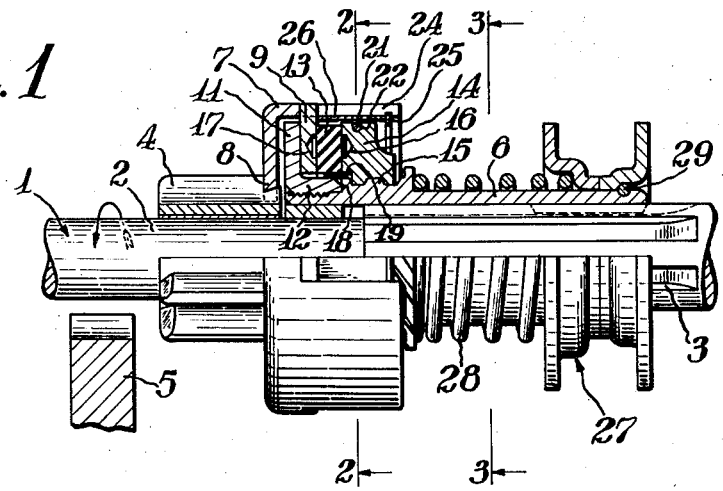
Fig. 1 is a side elevation partly in longitudinal section of a preferred embodiment of the present invention.

In the embodiment of the invention illustrated in Fig. 1, a motor shaft 1 which may be the extended armature shaft of a starting motor, not shown, is provided with a smooth portion 2 and a splined portion 3. A pinion 4 is slidably journalled on the smooth portion 2 of the motor shaft for longitudinal movement into and out of engagement with a member such as a flywheel gear 5 of an engine to be started, and a sleeve 6 is slidably keyed on the splined portion 3 of the shaft and provided with connections for imparting its longitudinal movement to the pinion 4 and for transmitting rotation from the motor shaft to the pinion.

According to the present invention, the connection between the sleeve 6 and pinion 4 comprises a barrel member 7 fixed in any suitable manner as indicated at 8 to the end of the pinion 4 and having splined therein a transmission disc 9. The disc 9 is normally located against a radial flange 11 of a stop nut 12 threaded on the end of the sleeve 6, and is frictionally engaged by an elastic transmission member 13 in the form of a ring of rubber or similar material, which ring is adapted to be compressed against the disc 9 by means of a nut 14 threaded as indicated at 15 on the sleeve 6. The pitch of the threads 15 is such that when the motor shaft 1 is rotated in the direction of the arrow, the nut 14 will be caused to clamp the transmission ring 13 against the disc 9 and transmit such rotation thereto, but when the pinion 4 overruns the motor shaft, the nut 14 backs away and permits the pinion, barrel and disc to overrun freely.

Perforations 16 and 17 are preferably provided in the surfaces of the nut 14 and disc 9 contiguous to the transmission member 13 in order to increase the torque capacity of the transmission formed thereby. In order to facilitate the free overrunning of the disc with respect to the transmission member, the latter is preferably anchored to the nut 14 by means such as the thimble 18 engaging the inner periphery of the transmission member 13 and seated in a tapered groove 19 in the nut 14.

Figure 2:
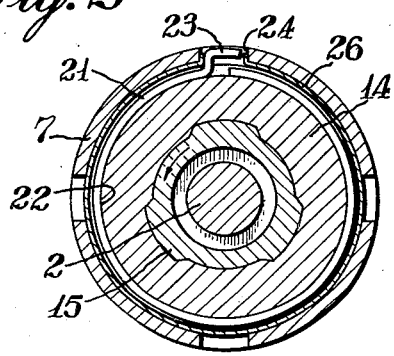
Fig. 2 is a section taken substantially on the line 2—2 of Fig. 1.
Figure 3:
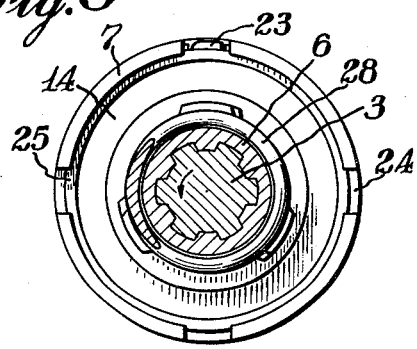
Fig. 3 is a section taken substantially on the line 3—3 of Fig. 1.

Means for insuring initial traversal of the nut 14 into engagement with the transmission member 13 is provided in the form of a friction ring 21 seated in a groove 22 in the periphery of the nut 14 and having an outturned end 23 (Fig. 2) engaging in one of the spline slots 24 formed in the barrel 7 for the disc 9.

The parts of the transmission are retained in the barrel 7 by suitable means such as a split ring 25 seated in the interior of the barrel, and a spacing thimble 26 is preferably provided between the disc 9 and the retaining ring 25 in order to cause longitudinal motion of the sleeve 6 to be transmitted through the disc 9 to the barrel 7 without lost motion.

Shifting means for the sleeve 6 are provided comprising a channeled collar 27 mounted thereon and arranged to be engaged by any suitable form of shifting means, not illustrated. Longitudinal motion of the collar 27 is transmitted to the sleeve 6 through a compression spring 28 in the usual manner, and a split ring 29 is seated on the end of the sleeve 6 for the purpose of retaining the shifting collar 27 thereon.

In the operation of this embodiment of the invention, the sleeve 6 with its associated parts is caused to be moved longitudinally by the operator until the pinion 4 meshes with the flywheel gear 5. The starting motor is then energized, causing rotation of the motor shaft 1 and sleeve 6. The nut 14 does not immediately partake of this rotation, due to its frictional connection by the detent ring 21 with the barrel 7. The nut is thus caused to compress the transmission member 13 against the disc 9 until sufficient pressure is built up to enable the transmission member to rotate the pinion 4 through the disc 9 and barrel 7 and thus cause rotation of the engine member 5.

When the engine starts, the overrunning action of the pinion 4 under the impetus of the engine member causes the nut 14 and transmission member 13 to move away and release the disc 9 so that the pinion, barrel and disc overrun freely until the pinion is withdrawn from mesh by the operator.

Figure 4:
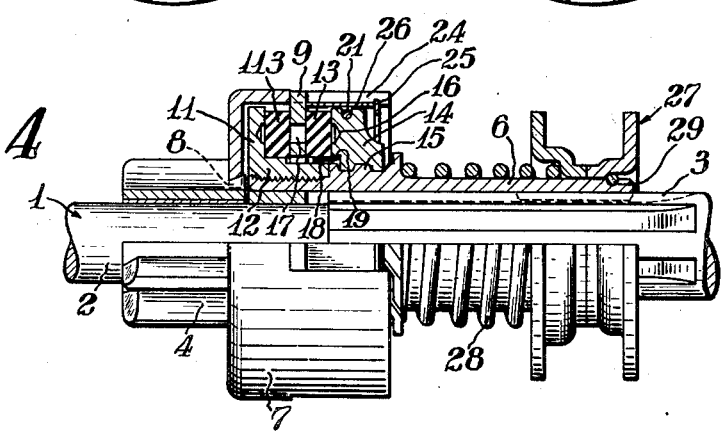
Fig. 4 is a view similar to Fig. 1 of a somewhat modified embodiment of the invention.

In the structure illustrated in Fig. 4, the torque capacity of the connection between the nut 14 and barrel 7 has been increased by duplicating the transmission member 13 so as to form two such connections to the disc 9. As there shown, this is accomplished by interposing a second transmission ring 113 between the disc 9 and the flange 11 of the stop nut 12. This arrangement not only increases the torque capacity of the coupling, but also is conducive to greater quietness in action in that the disc 9 is cushioned with respect to the transmission of shock therethrough in both directions. The remaining parts of the starting device are the same as those previously described and are similarly numbered.

It will be understood that inasmuch as the overrunning connection herein disclosed is inherently capable of transmitting high torque without the necessity of heavy axial pressure, the pitch of the threads 15 whereby such pressure is secured may be quite high so that the engaging action is quickly secured, and release of the connection is rapid and unfailing.

Although but two embodiments of the invention have been shown and described in detail, it will be understood that other embodiments are possible and that various changes may be made in the design and arrangement of the parts without departing from the spirit of the invention as defined in the claims appended hereto.

What is claimed is:

1. In an engine starter, a shaft, a sleeve splined thereon, a pinion freely journalled on the shaft for longitudinal movement into and out of engagement with a member of an engine to be started, a barrel member fixed at one end to the pinion and surrounding one end of the sleeve, a stop nut rigidly anchored on the sleeve, a clutch member threaded on the sleeve, a clutch disc loosely mounted on the sleeve between the stop nut and clutch member and rigidly anchored in the barrel, a ring of elastic material having a high coefficient of friction loosely mounted on the sleeve adjacent said clutch disc, and a detent mounted on the clutch member and splined in the barrel causing rotation of the sleeve to actuate the clutch member to clamp the ring and clutch disc against the stop nut.

2. In an engine starter, a shaft, a sleeve splined thereon, a pinion freely journalled on the shaft for longitudinal movement into and out of engagement with a member of an engine to be started, a barrel member fixed at one end to the pinion and surrounding one end of the sleeve, a stop nut rigidly anchored on the sleeve, a clutch member threaded on the sleeve, a clutch disc loosely mounted on the sleeve between the stop nut and clutch member and rigidly anchored in the barrel, a ring of elastic material having a high coefficient of friction loosely mounted on the sleeve adjacent said clutch disc, a detent mounted on the clutch member and splined in the barrel causing rotation of the sleeve to actuate the clutch member to clamp the ring and clutch disc against the stop nut, a shift collar loosely mounted on the sleeve, and means for yieldingly transmitting longitudinal movement from the shift collar to the sleeve.

3. In an engine starter, a shaft, a sleeve splined thereon, a pinion freely journalled on the shaft for longitudinal movement into and out of engagement with a member of an engine to be started, a barrel member fixed at one end to the pinion surrounding one end of the sleeve and having a plurality of longitudinal slots extending from its free end, a stop nut rigidly anchored on the end of the sleeve within the barrel, a clutch member threaded on the sleeve, a clutch disc loosely mounted on the sleeve between the stop nut and clutch member having radial projections fitting in the slots in the barrel, means including a sleeve within the barrel abutting the clutch disc for preventing longitudinal movement of the disc in the barrel, a ring of elastic material having a high coefficient of friction loosely mounted on the sleeve adjacent said disc, said clutch member having a peripheral groove, and a spring ring frictionally mounted in the groove and having a projection slidably mounted in a slot of the barrel.

YOUSTON SEKELLA.